United States Patent [19]

Gladney et al.

[11] Patent Number: 4,700,421
[45] Date of Patent: Oct. 20, 1987

[54] RAMP FOR LOADING SMALL MOTORIZED VEHICLES ON PICKUP TRUCKS

[76] Inventors: Tommy C. Gladney, P.O. Box 363; William E. Baker, Rt. 3, Box 299, both of Eupora, Miss. 39744

[21] Appl. No.: 832,062

[22] Filed: Feb. 24, 1986

[51] Int. Cl.⁴ .............................................. E01D 1/00
[52] U.S. Cl. ..................................... 14/69.5; 414/537
[58] Field of Search ................ 14/69.5, 71.1; 414/537; 296/61; 224/42.03 R; 404/35, 36

[56] References Cited

U.S. PATENT DOCUMENTS

| | | | |
|---|---|---|---|
| 1,103,155 | 7/1914 | Niswanger | 14/69.5 X |
| 2,338,785 | 1/1944 | Sommerfeld | 404/36 |
| 2,491,870 | 12/1949 | McLaughlin | 14/69.5 |
| 3,690,481 | 9/1972 | Pelletier | 414/537 |
| 3,737,058 | 6/1973 | Johnson | 296/61 X |
| 4,129,916 | 12/1978 | Schlesinger et al. | 14/69.5 |

Primary Examiner—James A. Leppink
Assistant Examiner—Matthew Smith
Attorney, Agent, or Firm—Larson and Taylor

[57] ABSTRACT

A ramp assembly provides loading of small off-the-road vehicles onto, and unloading of such vehicles from the bed of a pick-up truck. The assembly includes a flexible support such as a sheet of lightweight chain link, cloth belting or the like which is connected at the upper end to the corner posts of the truck bed or otherwise secured to the truck and which is tensioned at the other end thereof by an elongate support member, connected at one end to the ball hitch on the truck. The connection to the corner posts is made by notched members which extend laterally from both sides of the flexible support to engage the walls of the posts.

19 Claims, 9 Drawing Figures

RAMP FOR LOADING SMALL MOTORIZED VEHICLES ON PICKUP TRUCKS

FIELD OF THE INVENTION

The invention relates to ramps for trucks and, more particularly, to a roll-up ramp for, in use, enabling small motorized vehicles of the two, three and four wheel type to be loaded onto the bed of a pick-up truck or other vehicle.

BACKGROUND OF THE INVENTION

The recreational use of relatively small motorized vehicles such as small four-wheel off-the-road jeep-like vehicles and other similar vehicles is becoming increasingly popular. Typically, the off-the-road vehicle is driven to site (e.g. a woods, park etc.) at which it is to be used using a heavier vehicle such as a pick-up truck and unloaded from the latter at the site. As the off-the-road vehicles become heavier, loading and unloading them becomes more of a problem.

Although some pick-up trucks and other trucks include, or can be fitted with, rigid ramps or loading inclines which are adapted to be attached to the rear of the truck to provide loading the bed, these ramps can be awkward to use because of their size and weight and often present obvious storage problems. Two examples of the patented art relating to rigid ramps are the ramps disclosed in U.S. Pat. Nos. 4,078,678 (Tordella) and 3,511,393 (Abromavage). The advantages of the invention over the solid, rigid ramps of the prior art will be evident from the discussion which follows.

SUMMARY OF THE INVENTION

In accordance with the present invention, a ramp assembly is provided for loading relatively small motorized vehicles, such as off-the-road vehicles referred to above, onto the loading bed of a relatively larger motorized vehicle such as a pick-up truck or the like so that the small vehicle can be transported by the larger vehicle. As will be evident, the ramp assembly of the invention is relatively lightweight and easy to assembly and disassemble. Further, the ramp assembly has relatively few parts and these parts can be readily stored away when the ramp is not in use.

The ramp assembly of the invention basically comprises a flexible support sheet which, in use, extends between the bed of the larger vehicle and the ground to form a ramp, and which is capable of being rolled up when not in use; means for securing one end of the support sheet on the bed of the larger vehicle; and means, comprising an elongate tensioning member extending between the larger vehicle and the other end of the support sheet, for tensioning and supporting the flexible support sheet so that the latter forms the ramp.

The larger vehicle will typically include side walls including inwardly directed corner posts at the rear end of the bed and, in accordance with one embodiment of the invention, the securing means preferably comprises a pair of members projecting laterally outwardly from opposite sides of the support sheet for engaging the walls of the corner posts. Advantageously, these laterally projecting members include notches therein for engaging the corner posts. Further, these laterally projecting members each preferably include a portion which is cut out to form a notch and bent up to form a projection for engaging the walls of a corner post. In addition, these members are preferably inclined at a small acute angle relative to the upper edge of the support sheet. Advantageously, one or more transverse support members are secured to the support sheet at the upper or proximal end thereof, i.e., the end attached to the truck, and the laterally projecting members are adjustably each affixed to a free end of such a transverse support member, i.e., to the opposite ends of the same member or to the free ends of two separate members. In another embodiment, the upper end of the support is affixed to the truck bed by means of short cables having end loops adapted to be connected to hooks provided in the bed of the truck.

Typically, the larger vehicle, i.e., the pick-up truck, will include a ball hitch and the elongate tensioning member, in one preferred embodiment, includes means for engaging the ball hitch. This ball hitch engaging means preferably comprises a U-shaped member. Further, the length of said elongate tensioning member is preferably adjustable to accomodate for trucks of different sizes. Advantageously, the elongate tensioning member includes first and second parts, one of these parts being telescopingly received in the other to thereby provide adjustment the overall length of the tensioning member.

In one preferred embodiment, the support sheet includes a transverse reinforcement member at the other end thereof and means mounted on this reinforcement member for engaging one end of the elongate tensioning member so as to connect the elongate tensioning member to this transverse reinforcement member. Preferably, the tensioning member engaging means simply comprises a short length of pipe which is welded to said reinforcement member and in which the one end of the tensioning member is received. The flexible support sheet preferably comprises a sheet of lightweight chain link although as discussed below, other materials can be used.

Other features and advantages will be set forth in or apparent from the detailed description of the preferred embodiments which follows.

DESCRIPTION OF THE PREFERRED EMBODIMENTS

Figure 1:
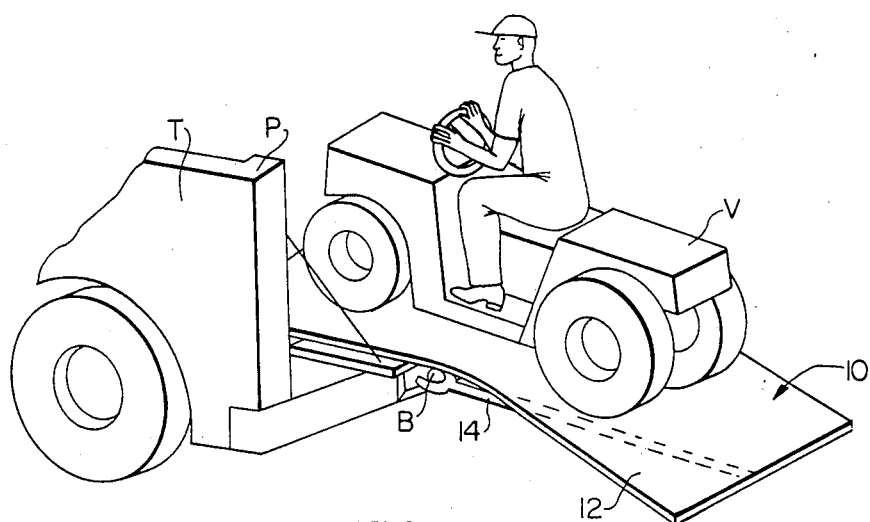
FIG. 1 is a perspective view of a loading ramp assembly constructed in accordance with the invention and incorporated on a pick-up truck onto which a smaller, four-wheel, off-the-road vehicle is being loaded.

Referring to FIG. 1, the ramp of the invention, which is generally denoted 10, is shown in use. As illustrated, a small motorized off-the-road vehicle, denoted V, is being driven up the ramp 10 according to the invention onto the bed of a pick-up truck, denoted T. As will be explained, the ramp 10 includes a flexible base or support sheet 12 which is secured at the top thereof to the corner posts of the truck and which itself is tensioned and supported by an elongate support member 14 which extends between the trailer ball hitch, denoted B, located on truck T and the bottom of ramp 10.

Figures 2, 3:
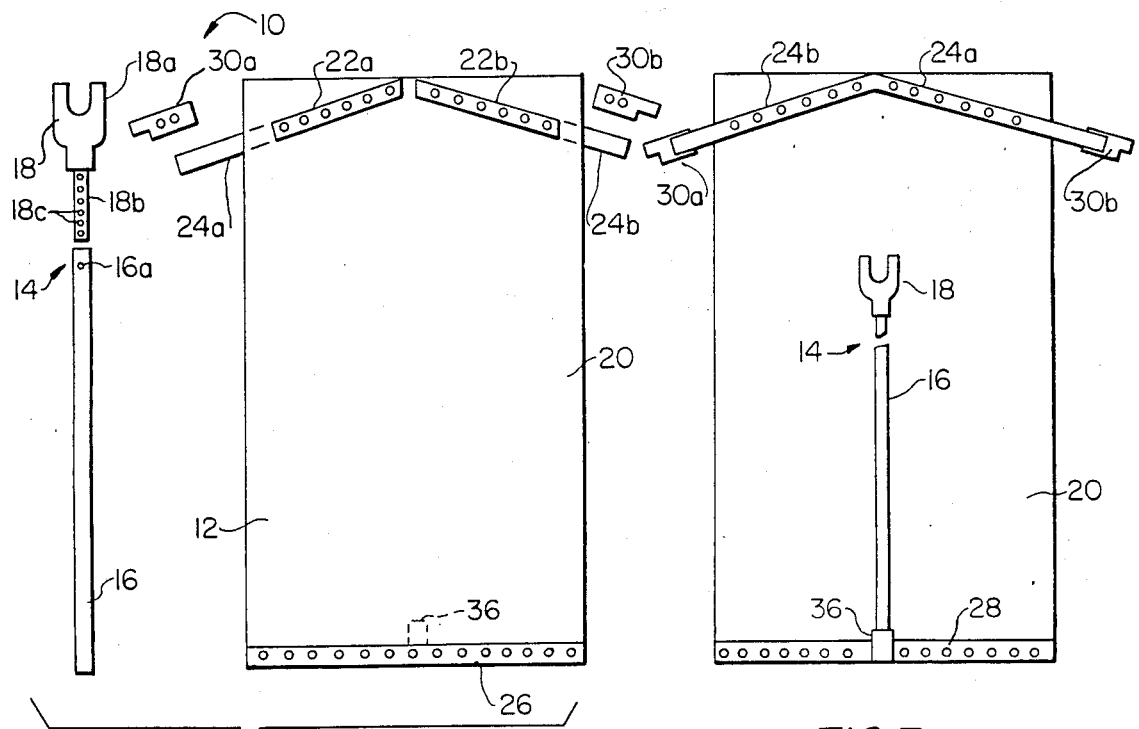
FIG. 2 is a top plan view of the basic components of the ramp assembly of the invention with the components disassembled.
FIG. 3 is bottom plan view of the ramp assembly of FIG. 2 with the components assembled.

Referring to FIG. 2, the basic components of ramp 10 are shown. The support member 14 includes an elongate pipe or tube 16, preferably fabricated of steel or the like, and a separate Y-shaped ball engaging member 18. The upper arms 18a of Y-shaped member 18 are generally horseshoe or U-shaped so as fit around the ball hitch B of the pick-up truck T as described above. This portion of member 18 is preferably coated with plastic, rubber or the like to prevent damage to the ball hitch. In a specific exemplary embodiment, the base of 18b of member 18 is a one-half inch solid steel rod which is ten inches long while arms 18a are two and one-half inches long. Base rod 18b includes a plurality of adjustment holes 18c spaced along the length thereof while pipe 16 includes a hole 16c therein so that when rod 18b is received in the end of pipe 16, the extent to which rod 18b extends therein can be adjusted and then fixed using a mating bolt (not shown). In this way, the overall length of support member 14 can be varied as desired.

Base support member 12 of ramp preferably comprises a rectangular flexible support sheet 20 formed from lightweight chain link or from the belting material used in conveyor belts although a number of different materials can also be used. However, it is noted that the use of chain link (e.g. 6 gauge) provides advantages over belting with respect to lightness and cost as will as with regard to the traction provided and the ability thereof to be rolled up into a tight roll. A pair of elongate steel plates 22a and 22b are arranged at the top end of support sheet 20 in a generally inverted V-shaped configuration, and mate with and are bolted to a further pair of elongate steel plates 24a and 24b on the other side of support sheet 20 (see also FIG. 3). A further pair of reinforcement plates 26 (FIG. 2) and 28 (FIG. 3) are bolted together on opposite sides of support sheet 20 at the bottom edge thereof. In the specific embodiment referred to above, all of the plates are formed of one inch wide, one quarter inch thick steel and are bolted together by 5/16 inch bolts.

Figure 5:
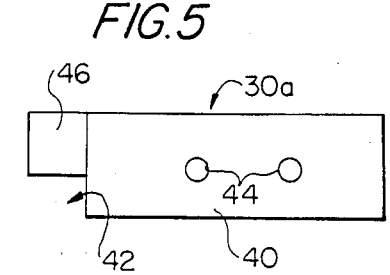
FIGS. 5 and 6 are top plan and side elevational views, respectively of the notched members shown in FIG. 4.
Figure 6:
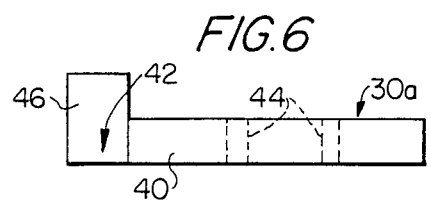

The ramp assembly 10 further includes notched members 30a and 30b which have notched ends adapted to fit against the posts of the wall of the pick-up truck bed. This is illustrated, for example, in FIG. 4, wherein notched member 30a engages a corner post P of truck T. One of these notched members, viz., member 30a, is shown in more detail in FIGS. 5 and 6, and as shown, comprises an elongate flat plate 40 having a notch 42 formed therein and a series of bolt holes 44 spaced therealong. Notch 42 is preferably formed by providing a cut in the side edge of plate 40 and bending up the cut portion to form upstanding portion 46 which offers extra support when engaging the wall of the truck bed. The notched ends of members 30a and 30b are preferably coated with a coating such as plastic, rubber or the like to prevent damage to the truck bed.

Figure 4:
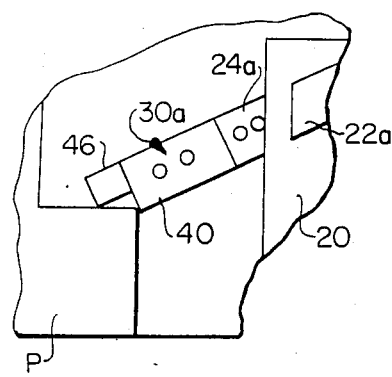
FIG. 4 is a detail, in plan and to an enlarged scale, showing one of the notched engagement members of FIGS. 2 and 3 in engagement with the corner post of a truck.

Plate members 24a and 24b extend outwardly on opposite sides of support sheet 20 so as to permit notched members 30a and 30b to be secured thereto. As can best be seen in FIG. 4, the free end of member 24a includes a series of holes spaced therealong which can be brought into alignment with the holes 44 in notched member 30a to permit the two to be bolted together. In the specific exemplary embodiment referred to above, members 24a and 24b extend laterally outwardly a distance of six inches on opposite sides of sheet 20 and include one-half inch holes spaced one inch apart while members 30a and 30b are six inches long and include one-half inch holes spaced three inches apart. Members 30a and 30b are bolted to the top of members 24a and 24b as indicated in FIG. 4.

Figure 7:
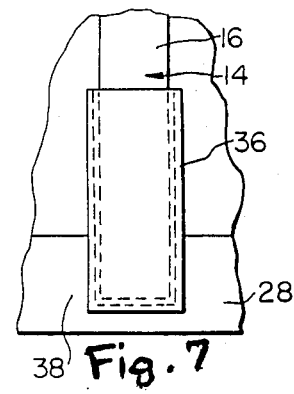
FIG. 7 is detail, to an enlarged scale, of the support receiving receptacle shown in FIG. 3.

Referring again to FIGS. 2 and 3, and also to FIG. 7, a short length of pipe 36, open at one end and closed at the other, is secured by welding or the like, indicated at 38, to plate 28 at the bottom of sheet 20. Pipe 36 is adapted to receive the end of pipe 16 of support member 14 therein, as shown in FIGS. 3 and 7. It will be understood that, in an alternative embodiment a solid metal rod (not shown), which would fit into pipe 16, could also be used.

Figure 9:
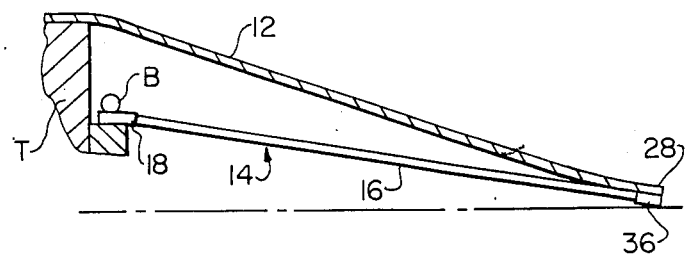
FIG. 9 is side elevational view, partially in section, of the ramp assembly of FIG. 8.
Figure 8:
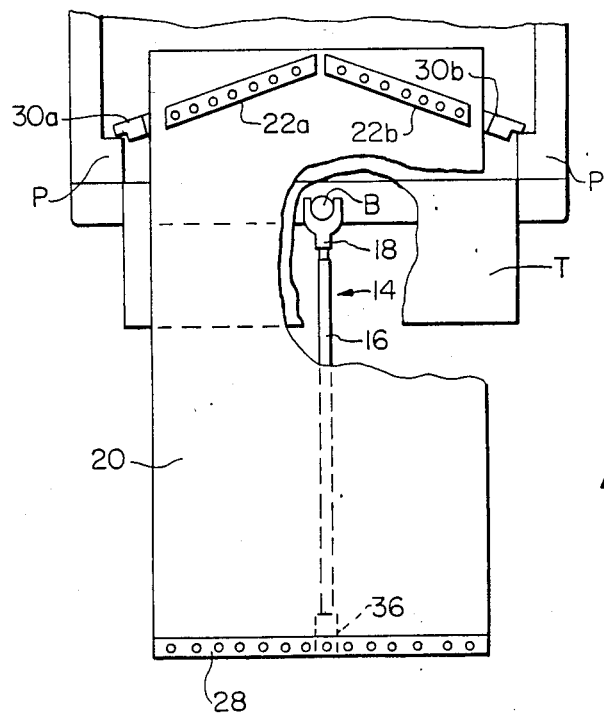
FIG. 8 is a top plan view, partially broken away, of ramp assembly in place on the bed of a truck.

Referring to FIGS. 8 and 9, these figures, along with FIG. 1, show how the ramp 10 is mounted on a truck 10. As should be evident from the foregoing, notched members 30a and 30b, which are adjustably affixed to the ends of reinforcement plates 24a and 24b, respectively, are used to secure the forward or upper end of ramp 10 in place in the bed of truck T, with the notches of members 30a and 30b engaging the walls of the corner posts P of the truck T as shown in FIG. 8 (see also FIG. 4). Tensioning of ramp 10 is provided by support member 14 which, as shown in FIG. 9, engages ball hitch B of truck T, at one end, by means of the horseshoe shaped end portion 18a and, at the other end, is received in the open end of pipe member 36 secured to the plate 38 at the bottom of ramp 10, as discussed above. The positions of notched members 30a and 30b along members 24a and 24b are readily adjustable in the manner described herein before and the length of support member 14 is also readily adjustable in a similar manner which was also discussed above.

The platform provided by support sheet 20 is sturdy and has been found in practice to be very effective. The support sheet 20 fits substantially flat or flush against the bed of the truck, with notched members 30a and 30b uppermost. This flat fit is important in that, when the ramp is loaded, the support provided by the flat surface of the truck bed is needed to stabilize the ramp. The base support 12 including flexible sheet 20 can be rolled up for ready storage along with support member 16.

It is noted that the ramp 10 is most effective when secured to a vehicle on fairly level ground. However the support member 14 can be shortened or lengthened to compensate for non-level or uneven ground. After being attached to the vehicle, the lower end of the ramp 10 should preferably be about five inches above the ground. When initial pressure is applied to the ramp as the ramp is loaded, the ramp will immediately be pressed to the ground. This tensioning of the ramp is helpful in stabilizing the ramp and results in a very stable, sturdy platform, providing good traction for the motorized vehicles climbing up the ramp.

It will be understood that the ramp can be attached to a pick-up truck using means other than the notched members 30a and 30b. In this regard, for example, short lengths of cable can be attached to the upper end of the ramp for attachment, by means of loops at the ends of the cables, to hooks provided on the pick-up bed, i.e., hooks bolted into holes drilled in the bed.

Although the invention has been described relative to presently preferred embodiments thereof, it will be understood by those skilled in the art that variations and modifications can be effected in these preferred embodiments without departing from the scope and spirit of the invention.

We claim:

1. A ramp assembly for loading relatively small motorized vehicles on, and unloading such vehicles from, the loading bed of relatively larger motorized vehicles of the type including a ball hitch so that such a relatively small vehicle can be transported by the larger vehicle, said ramp assembly comprising:
   a flexible support sheet which, in use, extends between the bed of the larger vehicle and the ground to form a ramp, said support sheet being of a flexible construction which is capable of being rolled up when not in use;
   means for securing one end of the support sheet on the bed of the larger vehicle; and
   means, comprising an elongate tensioning member extending between the larger vehicle and the other end of the support sheet, for tensioning and supporting the support sheet so that the support sheet is held taut and thereby forms the ramp, said elongate tensioning member including means engaging the ball hitch of the larger vehicle.

2. A ramp assembly as claimed in claim 1 wherein the larger vehicle includes side walls including inwardly directed corner posts at the rear end of the bed and said securing means comprises a pair of members projecting laterally outwardly from opposite sides of said support sheet for engaging the walls of the corner posts.

3. A ramp assembly as claimed in claim 2 wherein said laterally projecting members include notches therein for engaging the corner posts.

4. A ramp assembly as claimed in claim 2 wherein said laterally projecting members each include a portion which is cut out to form a notch and bent up to form a projection for engaging the walls of a corner post.

5. A ramp assembly as claimed in claim 2 wherein said laterally projecting members are inclined at a small acute angle relative to the upper edge of the support sheet.

6. A ramp assembly as claimed in claim 2 further comprising at least one transverse support member secured to said support sheet at said one end and having at least one free end, said laterally projecting members each being adjustably affixed to a free end of a said transverse support member.

7. A ramp assembly as claimed in claim 1 wherein said ball hitch engaging means comprises a U-shaped member.

8. A ramp assembly as claimed in claim 1 wherein the length of said elongate tensioning member is adjustable.

9. A ramp assembly as claimed in claim 7 wherein said elongate tensioning member includes first and second parts one of said parts being telescopingly received in the other to provide adjustment of the overall length of said tensioning member.

10. A ramp assembly as claimed in claim 1 wherein said support sheet includes a transverse reinforcement member at the other end thereof and means mounted on said reinforcement member for engaging one end of said elongate tensioning member so as to connect the elongate tensioning member to said transverse reinforcement member.

11. A ramp assembly as claimed in claim 10 wherein said tensioning member engaging means comprises a short length of pipe welded to said reinforcement member in which said one end of said tensioning member is received.

12. A ramp assembly as claimed in claim 1 wherein said flexible support sheet comprises a sheet of chain link.

13. A loading ramp assembly for loading pick-up trucks and like vehicles including a bed surrounded on two sides by sidewalls having inwardly directed corner posts at the rear end of the truck and a ball hitch at the rear of the truck, said ramp assembly comprising:
   a flexible support member including means at one end thereof for engaging the walls of the corner posts of the truck to secure that end of the support member to the truck; and
   an elongate strut member connected between the truck and the other end of said flexible support member for tensioning and supporting said flexible support member so that the latter is held taut and thereby forms a ramp, said strut member including means at one end thereof for engaging the ball hitch of the truck.

14. A loading ramp assembly as claimed in claim 13 wherein said corner post engaging means includes a pair of engagement members shaped to engage the wall of the corner post and adjustable in position relative to the flexible support member so as to accomodate truck beds of different sizes and shapes.

15. A loading ramp assembly as claimed in claim 13 wherein said strut member is adjustable in length and comprises first and second telescoping parts, said ball hitch engaging means comprising a U-shaped portion of one of said parts.

16. A loading ramp assembly as claimed in claim 15 wherein said flexible support member includes a receptacle member secured to said other end thereof for receiving therein the free end of the other of said first and second parts.

17. A loading ramp assembly as claimed in claim 13 wherein said flexible support member comprises a sheet of lightweight chain link.

18. A loading ramp assembly for loading pick-up trucks and the like vehicles of the type including a ball hitch or the like at the rear of the vehicle, said ramp assembly comprising:
   a flexible support member including means at one end thereof for engaging the bed of the vehicle to secure that end of the support member to the vehicle; and
   means, comprising an elongate strut member which, in use, is connected between the truck and the other end of said flexible support member, for tensioning and supporting said flexible support member so that the latter is stretched out and held taut, threby forming a ramp, said strut member including means at one end thereof engaging the ball hitch of the vehicle.

19. A loading ramp assembly as claimed in claim 18 wherein said strut member comprises first and second parts, a portion of one of said parts being received in the other part an adjustable amount so as to permit adjustment of the length of said strut member, and wherein said ball hitch engaging means comprises a U-shaped portion of one of said parts.

* * * * *